(12) United States Patent
Reid

(10) Patent No.: US 6,233,616 B1
(45) Date of Patent: May 15, 2001

(54) ENTERPRISE NETWORK MANAGEMENT USING DIRECTORY CONTAINING NETWORK ADDRESSES OF USERS OBTAINED THROUGH DHCP TO CONTROL ROUTERS AND SERVERS

(76) Inventor: William J. Reid, 7819 Pencross La., Dallas, TX (US) 75248

( * ) Notice: Subject to any disclaimer, the term of this patent is extended or adjusted under 35 U.S.C. 154(b) by 0 days.

(21) Appl. No.: 09/067,897

(22) Filed: Apr. 28, 1998

Related U.S. Application Data

(63) Continuation-in-part of application No. 08/956,697, filed on Oct. 24, 1997.
(51) Int. Cl.[7] ............................. G06F 15/173; G06F 15/16
(52) U.S. Cl. .......................... 709/225; 249/203; 249/220; 249/227

(58) Field of Search .................................... 709/225, 249, 709/203, 220, 227

(56) References Cited

U.S. PATENT DOCUMENTS

| | | | |
|---|---|---|---|
| 5,548,726 | * | 8/1996 | Pettus ................................. 709/221 |
| 5,594,921 | * | 1/1997 | Pettus .................................... 710/11 |
| 5,774,668 | * | 6/1998 | Choquier et al. .................... 709/223 |
| 5,884,039 | * | 3/1999 | Ludwig et al. ...................... 709/227 |
| 5,922,049 | * | 7/1999 | Radia et al. ......................... 709/220 |

* cited by examiner

*Primary Examiner*—Krisna Lim
(74) *Attorney, Agent, or Firm*—John E. Vandigriff

(57) ABSTRACT

An enterprise network using a wide area network (WAN), and having remote users connected to this WAN, uses a master directory containing network addresses of users obtained from a DHCP server to determine access rights, including the ability to access the WAN through the routers and the ability to access serves over the WAN.

24 Claims, 2 Drawing Sheets

ENTERPRISE NETWORK MANAGEMENT USING DIRECTORY CONTAINING NETWORK ADDRESSES OF USERS OBTAINED THROUGH DHCP TO CONTROL ROUTERS AND SERVERS

RELATED APPLICATIONS

This application is a continuation-in-part of Ser. No. 956,697, filed Oct. 24, 1997.

FIELD OF THE INVENTION

The present invention relates to computer networks for managing enterprise network access and providing enterprise network security.

BACKGROUND OF THE INVENTION

The marketplace for many companies has expanded tremendously in recent years. Large national companies have expanded into international or global companies that see their marketplace as the world; and even smaller companies have expanded into the international and global marketplace to become international competitors. This market expansion has been driven by the technology that has made both voice and data communication easier.

Technological advances in recent years have allowed computer users to maintain access to their corporate or home information networks from remote locations. Therefore, regardless of someone's work or travel location, he or she can maintain contact with desired networks through "remote offices," "mobile computing," or "telecommuting."

Remote offices, as they are referred to here, are those subsidiaries or divisions of a company organization that are geographically spaced from the main or base office. These include, but are not limited to, foreign manufacturing plants, regional sales offices, and vendor organizations. Mobile computing, as it is used here, is directed to the use of transportable self-contained computers, such as laptop computers. Mobile computing also includes the method of establishing a telecommunications link to a server or network of other computers. Lastly, telecommuting, as it is used here, refers to the use of a telecommunications link, preferably through a computer, to enable an individual to conduct his or her business from any desired location, rather than be required to physically travel to a particular location.

Co-pending application Ser. No. 956,697, filed Oct. 24, 1997, entitled ENTERPRISE NETWORK MANAGEMENT USING DIRECTORY CONTAINING NETWORK ADDRESSES OF USERS AND DEVICES PROVIDING ACCESS LISTS TO ROUTERS AND SERVERS is directed to local area computer networks ("LANs") connected over a wide area network ("WAN"). The system described in this application includes firewalls to control the information flow and restrict user access from WAN circuits. According to this co-pending application, computer networks use routing or switching devices to route user messages and files to and from internal LANs and the external WAN. The messages and files of the directory services are contained on LAN server devices and the information in these messages and files are routed across the WAN.

Co-pending application Ser. No. 956,697, filed Oct. 24, 1997, also is directed to directory services products that may be used to integrate phone directory information, e-mail, and facsimile addressing across an enterprise network. In this context, an enterprise network includes two or more LANs connected through one or more WANs. LDAP consist of workstations, servers, routers, switches and hubs. Users may also dial-in to obtain access to these enterprise resources. The directory services products are software applications that communicate among themselves using a directory access protocol ("DAP") and intercommunicate with other devices, such as mail servers, with a lightweight directory access protocol ("LDAP").

Finally, co-pending application Ser. No. 956,697, filed Oct. 24, 1997, extends the concept of directory services to the management and control of an enterprise network by integrating directory technology, router management, and server management to form an enterprise network management and security solution. The features and advantages of this co-pending application, however, do not extend to the use of directory services to control access by remote users to elements of an enterprise network. It is desirable to have a system with these capabilities.

SUMMARY OF THE INVENTION

The present is a system and method for enhancing the capabilities of an enterprise network and security through directory services. These enhancements are directed to directory enabled network management and network security for use in LAN communications over a WAN. Use of the present invention will permit mobile computer users to move from one LAN to another LAN without experiencing problems in gaining access to their home LAN or network. This includes establishing a connection from a remote hotel or airport to their home LAN or network.

To accommodate this freedom of movement by mobile computer users in an enterprise network, it is desirable to provide them with a dynamic IP address. This dynamic IP address is obtained from a DHCP (Dynamic Host Control Protocol) server. DHCP is a protocol that dynamically assigns addresses to devices on a network. With dynamic addressing, a mobile computing device, such as a laptop computer, can have a different IP address every time it connects to the network. Dynamic addressing simplifies network administration because the control software is only required to store and track IP addresses in use rather than requiring an administrator to continuously manage this task.

Further, according to the present invention, directory services are updated with the IP information stored in the enterprise DHCP server on a periodic or an on-demand basis. By this being the case, directory services are capable of generating a request to retrieve DHCP information on a periodic basis or the DHCP server may transmit the information to directory services on an on-demand basis.

If the DHCP server is not part of the enterprise network, a dial-in connection may be made through an Internet service provider (ISP) to access the DHCP server. In this type of system configuration, the enterprise network must contain an authentication server that knows the IP address of the dial-in user. Directory services are updated with the IP information stored in the enterprise network authentication server on a periodic basis or on an on-demand basis. Directory services are capable of generating a request to obtain the IP information from the authentication server on a periodic basis or the authentication server may transmit the information to the directory services application on an on-demand basis.

Once the directory services has obtained the user IP information, and it associates that information with the other user information stored in the directory, such as user name, password, public keys, network location, and the network management and security, as described in Ser. No. 956,697, filed Oct. 24, 1997, is provided to these mobile users.

An object of the present invention is to provide a system and method for enterprise network management that uses directory services to control access to elements of the enterprise network.

A further object of the present invention is to provide a system and method for management of an enterprise network that uses the combined operation of a DHCP server, and directory services server to control access to elements of an enterprise network.

Another object of the present invention is to provide a system and method for management of an enterprise network that uses the combined operation of a DHCP server, authentication server, and directory services server to control access to elements of an enterprise network.

These and other objects of the present invention will be described in detail in the remainder of the specification referring to the drawings.

DETAILED DESCRIPTION

The present invention is a system and method for enhancing the capabilities of an enterprise network and security through directory services. The present invention comprises an enterprise network management system and method for operation of that enterprise network. The present invention also provides for security by integrating directory technology with router/gateway management and server management.

Figure 1:
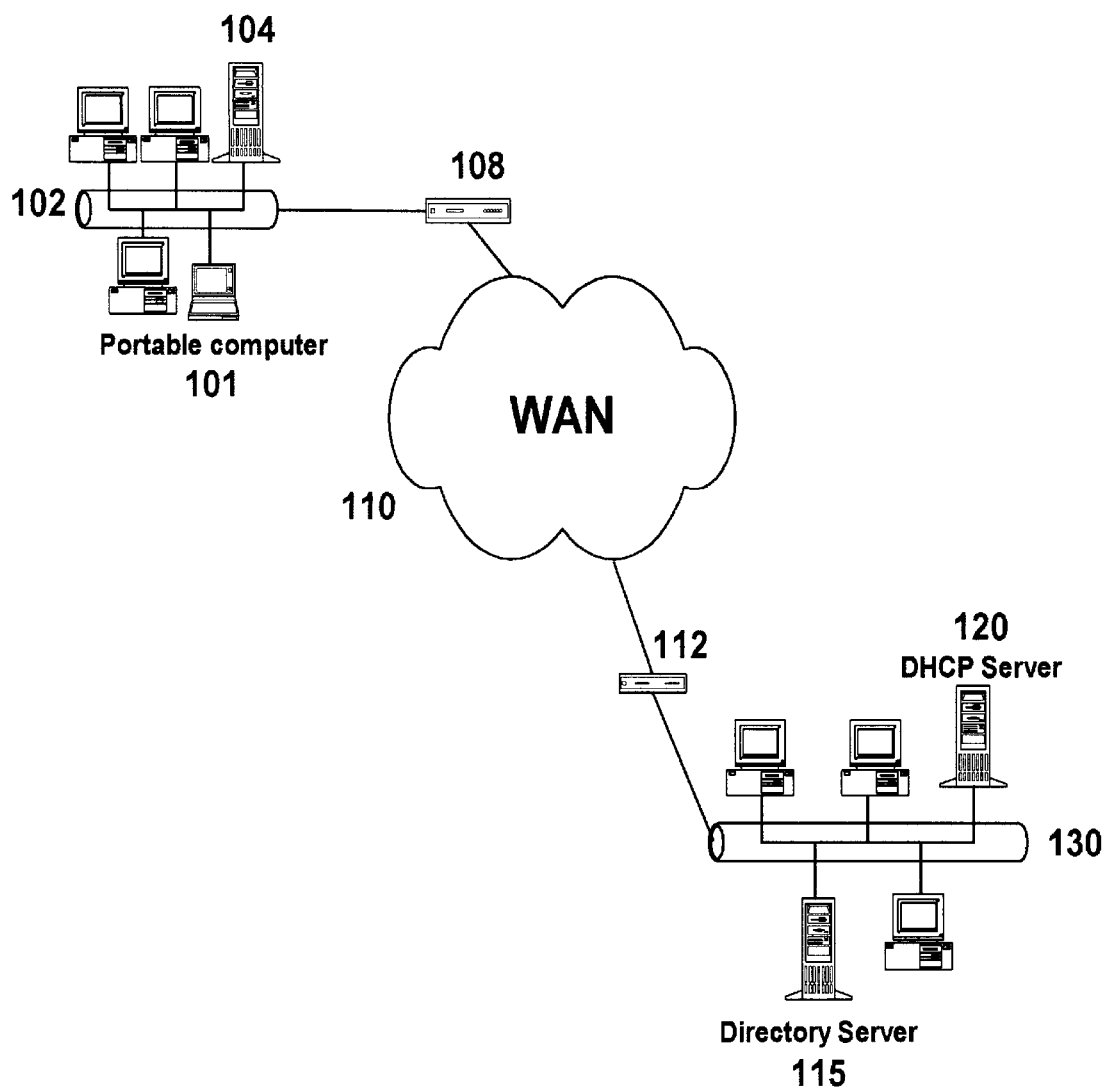
FIG. 1 is a functional block diagram illustrating an exemplary architecture and topology embodying the directory management of the present invention.

FIG. 1 shows a functional block diagram of the architecture and topology of the directory management system of the present invention for use with mobile users over a voice or data grade system. Although the present invention is described for use with mobile users, it will apply equally to remote offices and telecommuters as well.

In FIG. 1, it is assumed that a mobile user with portable computing device 101 is currently at remote office location and this mobile user desires to access a home-computing network from this remote office location. Portable computing device 101 may be a laptop computer, notebook computer, or any other device capable of remote digital information processing, such as a Portable Data ("PDA") terminal, Personal Communication System ("PCS") device, hand-held computer, pen-based computer, or tablet based computer. The device that will be used to remotely access the home-computing network also may be a fixed terminal at a remote location, such as a terminal at an airline courtesy lounge at an airport. However, preferably the device is a portable computing device.

Portable computing device 101 is connected to remote LAN 102. This connection may be a hardwire (physical) connection or connection via an air interface. The portable computing device stores its IP configuration set. This stored IP configuration set is used to request a DHCP assigned IP address.

According to the present invention, portable-computing device 101 issues a DHCP request during initialization. Since remote LAN 102 has no DHCP server, router 108 is configured to service this request when it is received from portable computing device 101. Specifically, router 108 is configured to forward the DHCP request from portable computing device 101 to DHCP server 120 on the other side of the WAN 110. This is accomplished by router 108 transmitting the DHCP request across WAN 110 to router 112. Router 112 is configured to forward DHCP requests to DHCP server 120 for processing.

According to the present invention, WAN 110 may be an Intranet that uses TCP/IP (transmission control protocol/internet protocol), the Internet with a tunneling protocol or a SMOS (Switched Multimegabit Data Service) using TCP/IP.

Once the request is received and processed by DHCP server 120, the DHCP server will transmit a dynamically assigned IP address to portable-computing device 101. This dynamically assigned IP address will become part of the remote LAN 102 address space as long as portable computing device 101 is connected or associated with LAN 102. This will now be discussed referring to FIG. 1.

Devices 140, 142, 144 and 146, along with portable computing device 101, connect to remote LAN 102. Remote LAN 102 may have IP address of 207.43.165., and router 108 may have address 207.43.165.1. Devices 140, 142, 144, and 146 may have been assigned IP addresses according to Table 1. Moreover, once portable computing device 101 was connected to remote LAN 102, it may have been dynamically assigned the IP address according to Table 1:

TABLE 1

| Device | IP Address |
|---|---|
| 140 | 207.43.165.7 |
| 142 | 207.43.165.8 |
| 144 | 207.43.165.9 |
| 146 | 207.43.165.10 |
| 101 | 207.43.165.41 |

Directory server 115, which connects to LAN 130, will generate and transmit a request to obtain IP information from DHCP server 120 on a periodic or an on-demand basis, or the DHCP server 120 may automically transmit the DHCP information to Directory Server 115. The directory server may be a master directory server or a shadow server, replacing the master or a directory agent storing a subset of the master. The IP information preferably will consist of a table associating TCP/IP addresses, names and source address, time, and date. After Directory Server 115 obtains the IP information from DHCP server 120, it will match the dynamically assigned IP address with the user information that is stored in the directory. This stored user information preferably is name, password, location, organization, keys, function, e-mail address, telephone number, home address, home telephone number, and employee identification number. Directory server 115 will then transmit IP information to router 112 and router 108 to permit portable computer 101 to access home LAN 130 network based on the IP information. The IP information that directory server 115 transmits to routers 108 and 112, preferably will consist of an updated user access list that now contains the 207.43.165.41. Directory server 115 also may transmit IP information to remote LAN server 104 to permit portable computing device 101 to access to the server of that LAN. The IP information that is transmitted to remote LAN server 104, preferably consists of an updated user access list that now contains the user with the address 207.43.165.41 (which is the same IP information that was transmitted to routers 108 and 112).

Security concerns may require that DHCP server 120 to authenticate the DHCP requests that it receives to validate that the user is genuine. This authentication may be DHCP server based authentication, or authentication through a separate gateway device or a secure key exchange.

Figure 2:
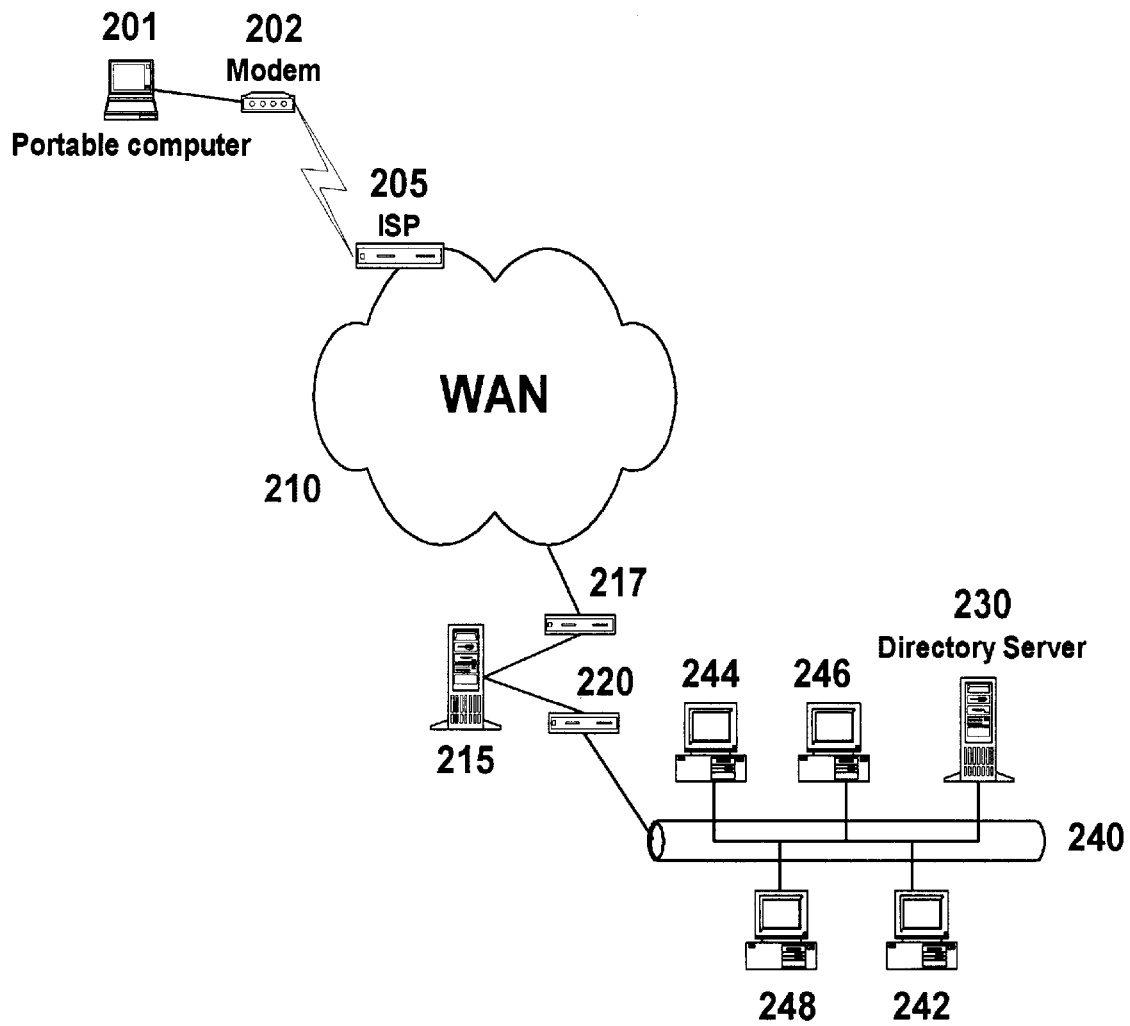
FIG. 2 is a functional block diagram illustrating the detailed operation of the network IP management of the present invention.

FIG. 2 is a functional block diagram illustrating the detailed operation of the network IP management of the present invention. FIG. 2 also illustrates an exemplary method for remote users to access a voice or data grade system of the present invention.

Portable computing device 201 includes modem 202 with a digital-to-analog converter ("DAC"). The modem DAC will convert the digital signals to analog signals for transmission over conventional voice transmission networks. In the case of portable computing device 201, modem 202 may be embodied on a PC card fitted into a slot on the computer. Commercially available modem cards, such as Cyber Express manufactured by TDK, Inc., are suited for this application with minimal customization, although the present invention is not limited to any particular means of providing modem 202, or its method and means for connection to portable computing devices.

Portable computing device 201 dials into WAN 210 through a terminal server connection, ISP 205. In FIG. 2, the terminal server is generally defined by a modem concentration server, such as the Cisco 5240. The terminal server, at ISP 205, authenticates the mobile user with his or her user name and user password. The terminal server includes a DHCP server that assigns portable computing device 201 an IP address. This server may or may not be connected to LAN 240.

In operation, portable computing device 201 requests and obtains a dynamically assigned IP address for a DHCP server (not shown) that is part of the terminal server. Once portable computing device 201 has its dynamically assigned IP address, access to LAN 240 will be controlled as will be described.

Portable computing device 201 communicates through ISP 205 across WAN 210 and through router 217 to Authentication server 215. Authentication server 215 verifies the identify of portable computing device 201. This is through the IP information about portable computing device 201 that was obtained from the DHCP server. An authentication server may typically be a firewall. An ACE server from Security Dynamics or a Radius Server from Funk Software, Inc. may be used as an authentication server.

Directory services server 230 will generate a request to obtain IP information from Authentication server 215 on a periodic or an on-demand basis, or Authentication server 215 may transmit the IP information to Directory Server 230. After directory services server 230 has received the IP information from Authentication server 215, it will match the dynamically assigned IP address with the user information that is stored in the directory. Directory server 230 will then transmit the information to router 220 to permit portable computer 201 to access home LAN 240. LAN 240, as shown, has computing devices 242, 244, 246, and 248 connected to it.

The terms and expressions which are used herein are used as terms of expression and not of limitation. There is no intention in the use of such terms and expressions of excluding the equivalents of the features shown and described, or portions thereof, it being recognized that various modifications are possible in the scope of the present in the scope of the present invention.

What is claimed is:

1. A network system interconnected over a wide area network (WAN), the network system comprising:
   a first large area network (LAN) connected to the WAN, with the first LAN having a router through which remote computing devices access the first LAN;
   at least a second LAN connected to the WAN;
   at least one remote computing device connected to the second LAN, with the remote computing device being capable of generating at least a dynamic host control protocol (DHCP) request;
   a DHCP server that is accessible through the first LAN, with the DHCP server being capable of dynamically assigning an IP address and transmitting the dynamically assigned IP address to a remote computing device that transmitted a DHCP request to the DHCP server, and the DHCP server being capable of generating IP information;
   a directory services server that is accessible through the first LAN, the directory services server being capable of obtaining the IP information generated by the DHCP server, with the directory services server generating access information for remote computing devices to access at least the first LAN; and
   the router of the first LAN being capable of receiving access information from the directory services server, the access information indicating which remote computing devices that connect to the second LAN will be permitted to access to the first LAN over the WAN.

2. The network of claim 1, wherein the WAN is a data grade network.

3. The network of claim 2, wherein the WAN is an Intranet that uses TCP/IP.

4. The network of claim 1, wherein the directory services server is periodically updated with access information.

5. The network of claim 4, wherein the directory services server is updated with access information daily.

6. The network of claim 1, wherein the IP information that is transmitted to the directory services server includes a table associating names and source addresses, the directory services server determining the name from the source address and determining whether access is to be permitted from the name associated with the source address.

7. The network of claim 1, wherein the directory services server includes a single master directory.

8. The network of claim 1, wherein the directory services server includes a distributed directory, distributed among LANs in an enterprise network.

9. A network interconnected over a wide area network (WAN), the network comprising:
   a first large area network (LAN) connected to the WAN, with the first LAN having a first and second router through which remote computing devices access the first LAN;
   at least a second LAN connected to the WAN;
   at least one remote computing device connected to the second LAN, with the remote computing device being capable of generating at least a dynamic host control protocol (DHCP) request and being capable of generating a request for accessing at least the first LAN;
   a DHCP server that is accessible by the first LAN and accessible by the remote computing device, with the DHCP server being capable of dynamically assigning an IP address and transmitting the dynamically assigned IP address to a remote computing device that transmitted the DHCP request and the DHCP server being capable of generating IP information;

an authentication server that is capable of responding to authenticate requests from remote computing devices for access to at least the first LAN, the authentication server being capable of authenticating an identity of a remote computing device requesting access to the first LAN and the authenticating server being capable of obtaining the IP information generated by the DHCP server;

a directory services server that is accessible through the first LAN, the directory services server being capable of obtaining IP information from the authentication server, with the directory services server being capable of generating access information for remote computing devices to access at least the first LAN;

the first router of the first LAN being capable of receiving authentication requests for remote computing devices for access to at least the first LAN, the first router being capable of transmitting authentication requests to the authentication server; and the second router of the first LAN being capable of receiving access information from the directory services server, the access information indicating which remote computing devices that connect to the second LAN will be permitted to access to the first LAN over the WAN.

10. The network of claim 9, wherein the WAN is a data grade network.

11. The network of claim 10, wherein the WAN is an Intranet that uses TCP/IP.

12. The network of claim 9, wherein the directory services server is periodically updated with access information.

13. The network of claim 12, wherein the directory services server is updated with access information daily.

14. The network of claim 9, wherein the IP information that is transmitted to the directory services server includes a table associating names and source addresses, the directory services server determining the name from the source address and determining whether access is to be permitted from the name associated with the source address.

15. The network of claim 9, wherein the directory services server indicates a single master directory.

16. The network of claim 9, wherein the directory server indicates a distributed directory, distributed among LANs in an enterprise network.

17. A network interconnected over a wide area network (WAN), the network comprising:

a first large area network (LAN) connected to the WAN, with the first LAN having a first and second router through which remote computing devices access the first LAN;

at least one remote computing device connected to the WAN, with the remote computing device being capable of generating at least a dynamic host control protocol (DHCP) request and a generating request for access to at least the first LAN;

a DHCP server that is accessible by the first LAN and accessible by the remote computing device, with the DHCP server being capable of dynamically assigning an IP address and transmitting the dynamically assigned IP address to a remote computing device that transmitted the DHCP request and the DHCP server being capable of generating IP information;

an authentication server that is capable of responding to authenticate requests from remote computing devices for access to at least the first LAN, the authentication server being capable of authenticating an identity of a remote computing device requesting access to the first LAN and the authentication server being capable of obtaining the IP information generated by the DHCP server;

a directory services server that is accessible through the first LAN, the directory services server being capable of obtaining IP information from the authentication server, with the directory services server being capable of generating access information for remote computing devices to access at least the first LAN;

the first router of the first LAN being capable of receiving authentication requests for remote computing devices for access to at least the first LAN, the first router being capable of transmitting authentication requests to the authentication server; and the second router of the first LAN being capable of receiving access information from the directory services server, the access information indicating which remote computing devices will be permitted to access to the first LAN over the WAN.

18. The network of claim 17, wherein the WAN is a data grade network.

19. The network of claim 18, wherein the WAN is an Intranet that uses TCP/IP.

20. The network of claim 17, wherein the directory services server is periodically updated with access information.

21. The network of claim 20, wherein the directory services server is updated with access information daily.

22. The network of claim 17, wherein the IP information that is transmitted to the directory services server includes a table associating names and source addresses, the directory services server determining the name from the source address and determining whether access is to be permitted from the name associated with the source address.

23. The network of claim 17, wherein the directory services server indicates a single master directory.

24. The network of claim 17, wherein the directory server indicates a distributed directory, distributed among LANs in an enterprise network.

* * * * *

UNITED STATES PATENT AND TRADEMARK OFFICE
CERTIFICATE OF CORRECTION

PATENT NO.    : 6,233,616 B1
DATED         : May 15, 2001
INVENTOR(S)   : William J. Reid Page 1 of 1

It is certified that error appears in the above-identified patent and that said Letters Patent is hereby corrected as shown below:

<u>Title page,</u>
ABSTRACT: Last line "serves" to -- servers --;

<u>Column 2,</u>
Line 14, change "do not" to -- can --;

<u>Column 4,</u>
Line 11, change "SMOS" to -- SMDS --;
Line 19, and 23, change "140, 142" to -- 142 --;
Line 33, eliminate this line in the Table 1;
Line 55, change "will" to -- can --;

<u>Column 6,</u>
Line 4, change "large" to -- local --;
Line 52, change "large" to -- local --;

<u>Drawings,</u>
Figure 1, add labels to objects 142, 144, 146.

Signed and Sealed this

Fifth Day of March, 2002

*Attest:*

JAMES E. ROGAN
*Attesting Officer*    *Director of the United States Patent and Trademark Office*